United States Patent Office 3,317,612
Patented May 2, 1967

3,317,612
BIODEGRADABLE SURFACE ACTIVE AGENTS
Leslie G. Nunn, Jr., Metuchen, and Leslie M. Schenck, Mountainside, N.J., assignors to General Aniline & Film Corporation, New York, N.Y., a corporation of Delaware
No Drawing. Filed Dec. 18, 1962, Ser. No. 245,414
1 Claim. (Cl. 260—613)

The present invention relates to a novel composition of matter obtained by the alkylation of phenol with butene-2 which is particularly adaptable as an intermediate for reaction with an alkylene oxide to yield surface active agents possessing new and novel properties.

It is well known that phenol may be alkylated with various mono-olefinic compounds in the presence of a catalyst or activator such as mineral acids, acid-activated clays, boron trifluoride, and the like. Regardless of the type of catalyst or activator employed, certain disadvantages are encountered. For example, mineral acids such as sulfuric acid may, in the alkylation reaction, function as an oxidizing agent and as a result the yield of the desired alkylated product is substantially decreased. Aluminum chloride and other generally employed metallic halides have the tendency to readily hydrolyze when in contact with small amounts of moisture, liberating hydrogen halides which are corrosive to the metallic alkylation equipment. As a consequence, the alkylation reaction, when using such halides, must be conducted in expensive glass-lined equipment. In the case where boron trifluoride is employed as the catalyst or activator, no reaction occurs until an induction period has elapsed, after which a high exothermic reaction is initiated with almost explosive violence. In view thereof, the alkylation reaction temperatures are exceedingly difficult to control and as a result the quality of the alkylated product is seriously impaired. This is clearly manifest when a mono-olefinic hydrocarbon of from 4 to 16 carbon atoms is employed as the alkylating medium and which must be first added to the phenol-boron trifluoride mixture. In addition, the ratios of reactants are constantly changing throughout the reaction in which the phenol to mono-olefin ratio is quite high in the first portion of the reaction and gradually decreases as more mono-olefin is added.

The patent art is replete with various processes to overcome the foregoing disadvantages. In this connection, fluorosulfonic acid has been suggested as the catalyst or activator whereby any olefin or di-olefin may be employed in the alkylation of the phenol to undergo a complete reaction. In the latter process it has been found that when isobutylene is employed as the mono-olefin in the presence of benzene as a diluent, a mixture is obtained which, after fractional distillation, yields a substantial amount of unreacted phenol, a small portion of o-tertiary butyl phenol, a fairly large amount of p-tertiary butyl phenol, and a small amount of polyisobutylene mixed with high molecular weight phenols.

It has been established that if boron trifluoride is employed as the catalyst in the alkylation of phenol with a mono-olefin or olefin polymers such as diisobutylene, the volume of unreacted materials is substantially large and both the mono-olefin and olefin polymers are polymerized, leaving excessive amounts of unreacted phenol.

Despite the proposal to employ boron trifluoride, aluminum chloride, hydrogen chloride and the like, ordinary concentrated sulfuric acid is preferred since it has been found, in general, to give advantageous results. When phenol is alkylated with isobutylene in the presence of sulfuric acid as a catalyst, a mixture of mono-, di-, and tri-tertiary butyl phenols is obtained. In order to recover the tri-tertiary butyl phenol, it is necessary to fractionate the mixture, which normally gives a yield of about 65% of the desired product. The final product, i.e., 2,4,6-tri-tertiary butyl phenol, solidifies to white crystals having a melting point of 130°–131° C. By replacing the isobutylene with butene-2 in this reaction, it has been found that less than 2 moles of the butene will react. The only reasonable conclusion to be arrived at is that butene-2 is not equivalent to isobutylene. This was indeed surprising and unexpected, since the art suggested that in this type of alkylation reaction boron trifluoride, hydrogen chloride, aluminum chloride, and the like may be employed in lieu of sulfuric acid, despite the fact that the later is more desirable because of its efficiency and cheapness.

The principal object of the present invention is to provide a novel composition of matter consisting of a well-defined mixture of butylated phenols not previously obtained by any of the well-known alkylation procedures and which is particularly adaptable as an intermediate in the preparation of surface active agents, by reaction with an alkylene oxide, having new and unexpected properties.

Other objects and advantages will become more clearly manifest from the following description:

We have discovered that when butene-2 is reacted while employing boron trifluoride as a catalyst, the expected mixture consisting predominantly of para-secondary butyl phenol and 2,4-di-secondary butyl phenol, with the remainder consisting entirely of 2,4,6-tri-secondary butyl phenol, is not obtained. Instead, a more complex liquid mixture is obtained which boils between 132° and 185° C. at 10 mm. pressure. The liquid mixture does not crystallize with any components present therein and remains fluid at all temperatures. In view of this unexpected and surprising result, the liquid mixture, when subjected to analysis, shows hydroxy numbers between 180 and 220 which would indicate molecular weights in the range of 312 to 256, respectively. A molecular weight determination of the liquid phenol mixture by the freezing point depression measurement in benzene gives a molecular weight of 262. Furthermore, the predominate properties of the mixture are not those reported in the literature for 2,4,6-tri-secondary butyl phenol. This clearly indicates that the liquid mixture, when employing butene-2 as the alkylating agent, is not predominately the expected tri-secondary butyl phenol.

In connection with the present invention it is to be noted that the prior art emphasizes that when butylene is employed as the alkylating agent, olefin polymers will be found and necessary steps should be taken to avoid or at least substantially preclude polymer formation. Otherwise, the desired alkylated products may not be obtained and if obtained in some measurable yields, the olefin polymers will hinder the separation of the desired product when subjected to distillation. Polymer formation is not a serious problem in the process utilized in accordance with the present invention.

If steps are taken to preclude polymer formation, the prior art also emphasizes that when phenol is alkylated with 2 to 4 moles of butylene one of the following butylated phenols should be the principal product:

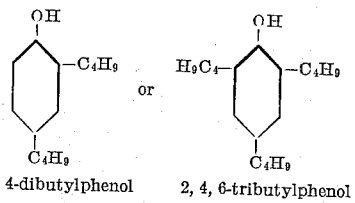

2, 4-dibutylphenol     2, 4, 6-tributylphenol

The outstanding and surprising result that we found when alkylating phenol with butene-2 in the presence of boron trifluoride is the obtainment of a novel and well-defined composition in a liquid state which is more readily handled in the subsequent reaction with alkylene oxides than tri-tertiary butyl phenol, which has a melting point of 130° C. and is characterized by a mixture of the following alkylphenols:

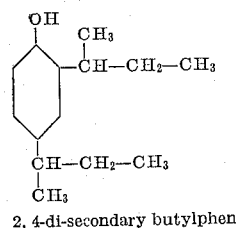
2, 4-di-secondary butylphenol

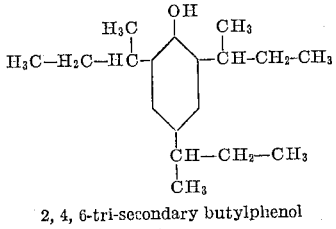
2, 4, 6-tri-secondary butylphenol

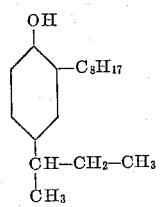
4-secondary butyl-2-octyl phenol

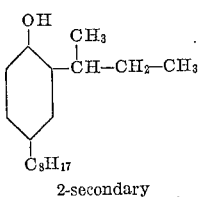
2-secondary butyl-4-octylphenol

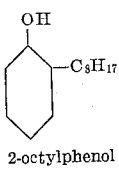
2-octylphenol

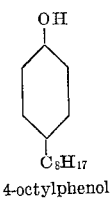
4-octylphenol

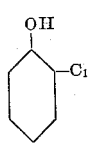
2-dodecylphenol

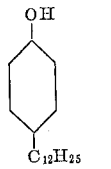
4-dodecylphenol

The foregoing liquid composition is much cheaper to prepare and when reacted with an alkylene oxide yields a surface active composition having several advantages over those prepared from tri-tertiary butyl phenol types and other alkyl phenols containing the equivalent number of carbon atoms as will be shown hereinafter.

The novel liquid composition of alkylated phenols of the present invention is prepared by the alkylation of 1 mole by weight of phenol with 2 to 4 moles by weight of butene-2 in the presence of from 0.6 to 1.8 parts by weight of boron trifluoride at a temperature ranging from 50° to 100° C. for a period of time of from 7 to 24 hours. For substantial uniformity of the composition of the resulting product, we prefer, however, to employ 1 mole by weight of phenol with 3 moles by weight of butene-2 in the presence of 1.2 parts by weight of boron trifluoride at a temperature of from 60° to 75° C. for a period ranging from 10 to 14 hours.

The following examples described in detail the procedure for accomplishing the above objects, but it is to be understood that they are given merely for the purpose of illustration and are not to be construed as limiting the scope of the invention. All parts given are by weight unless otherwise noted.

*Example I*

A mixture of 940 parts (10 mole) of phenol and 12 parts of $BF_3$ was heated to 60° C. and 1680 parts (30 mole) of butene-2 was added to the mixture at 60–70° C. over 6 hours. The butene-2 was added in the vapor phase under a slight positive pressure above atmospheric to prevent escape of butene-2 and $BF_3$ and was metered into the system through a flowmeter. After butene-2 addition was complete, the reaction mixture was heated to 75° C. and held at this temperature for 6 hours. It was then cooled to room temperature, washed with water, neutralized with aqueous NaOH, to remove the catalyst, and again washed with water. The reaction mixture was fractionally distilled under reduced pressure at 10 mm. Three fractions representing a total of 2224 parts (84.5%) were obtained, which boiled between 132°–185° C. at 10 mm. These fractions were analyzed by nuclear magnetic resonance, infra red spectrophotometry and gas chromatography. The infra red curves were obtained while measuring the spectral absorption vs. wavelength of a 100 g. per liter isooctane solution of the fraction vs. pure isooctane. The solution thickness was approximately 125γ. A Perkin-Elmer Model 21 double beam recording spectrophotometer having a spectral range of 2–15γ was used. The fraction comprising approximately 3% of the alkylate and distilling from 132° C. to 155° C. at 10 mm. was found to consist chiefly of 2,4-di-secondary butylphenol, 2,4-tri-secondary butylphenol, 2-octylphenol and 4-octylphenol. The fraction representing approximately 65% of the alkylate distilled within the 155° C. to 170° C. range at 10 mm. and consists primarily of 2-secondary butyl-4-octylphenol and 4-secondary butyl-2-octylphenol. The remaining fraction which represented approximately 5% distilled from 170° C. to 185° C. at 10 mm. and is substantially 2-dodecylphenol and 4-dodecylphenol.

*Example II*

A mixture of 940 parts (10 moles) of phenol and 6 parts of $BF_3$ was heated to 70° C. and 1120 parts (20 moles) of butene-2 was added at 70–80° C. over 3 hours. A slight positive pressure above atmospheric was maintained during the addition. The reaction mixture was then held at 100° C. for 4 hours. It was then cooled to room temperature, washed with water, dilute caustic solution and then with water. The mixture was distilled at 10 mm. A total of 2198 parts (80.3%) was obtained which distilled between 132 and 185° C. at 10 mm. Examination of the fraction distilling between 132° C. and 155° C. at 10 mm. showed that it comprised about 55% of a mixture consisting of 2,4-di-secondary butylphenol, 2,4,6-tri-secondary butylphenol, 2-octylphenol and 4-octylphenol. The fraction boiling at 155° to 170° C. represented approximately 40% of the distillate, and comprised about 40% of a mixture consisting of 2-secondary butyl-4-octylphenol and 4-secondary butyl-2-octylphenol. The remaining 5% of the distillate boiled at 170° to 185° C. at 10 mm. and consisted of a mixture of substantially 2-dodecylphenol and 4-dodecylphenol.

*Example III*

A mixture of 940 parts (10 moles) of phenol and 18 parts of $BF_3$ was heated to 50° C. and 2240 parts (40 moles) of butene-2 was added at 50°–60° C. over 12 hours. Butene-2 was bubbled through the mixture. A slight positive pressure was maintained through the reaction. The reaction mixture was held 12 hours at 50–60° C. after addition was completed. It was then extracted with water, dilute caustic solution and then water. The reaction mixture was distilled at 10 mm. The relative weight of distillate boiling in the 132–155° C. at 10 mm. range represented 15–20% and the fraction distilling between 155–185° C. at 10 mm. represented substantially 80–85% of the distillate. Examination of these fractions indicated they contained the same constitutents as in Example I.

From the foregoing examples, it becomes clearly evident that the components of the new and novel liquid composition of alkylated phenols consists of about 15 to 55% of a mixture consisting of 2,4-di-secondary butylphenol, 2,4,6 - tri-secondary butylphenol, 2-octylphenol and 4-octylphenol, 40 to 85% of a mixture consisting primarily of 2-secondary butyl-4-octylphenol and 4-secondary butyl-2-octylphenol, and from about 0.0% to 5% of a mixture consisting of substantially 2-dodecylphenol and 4-dodecylphenol.

To demonstrate that a mixture of mono-, di-, with a substantial amount of tri-tertiary-butylphenol is obtained when butene-2 of the foregoing examples is replaced by isobutene, the following experiments were conducted:

*Example IV*

Example I of U.S. Patent No. 2,248,828 was repeated to obtain the tri-tertiary-butylphenol. The physical constants, melting point, and boiling point checked with those reported in the literature. The nuclear magnetic resonance studies showed that the product is essentially pure and consistent with the structure of tri-tertiary-butylphenol:

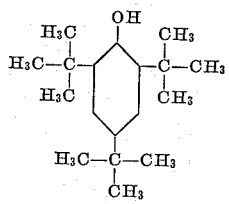

*Example V*

It is interesting to note that when Example I of the U.S. Patent No. 2,248,828 was repeated while employing butene-2 instead of isobutene, the reaction stopped after 0.87 moles of butene-2 per mole of phenol had been added. Examination of this butene-2 alkylation mixture did not reveal comparable amounts of tri-secondary butylphenol. This example clearly establishes that isobutene and butene-2 are not equivalent in the reaction of said patent.

*Example VI*

When Example I was repeated with isobutene instead of butene-2, 21% of the reaction product distills between 141–170° C. at 10 mm. This is further evidence that butene-2 and isobutene are not equivalent. Examination of the reaction product did not reveal appreciable quantities of tri-t-butylphenol. This is evidence that sulfuric acid and borontrifluoride are not equivalents when used as catalysts with isobutene.

From the foregoing examples and laboratory data it is clearly evident that the alkylation of phenol with butene-2 with boron trifluoride as the catalyst under the specified conditions yields a well-defined mixture of butylated phenols. This mixture when subjected to ethoxylation yields surface active agents which break down biologically more readily than those of the type such as alkyl phenoxy polyethylene glycols, and alkyl benzene sulfonates.

Ethoxylation of tri-tertiary butylphenol with 1 to 150 moles of ethylene oxide per mole of phenol yields surface agents which are difficult to degrade biologically. In other words, such surface active agents, as well as those of alkylphenoxy polyethylene glycol and alkyl benzene sulfonates, cannot be readily broken down by bacteria in sewage disposal plants. The slow rate of biodegradability of such surface active agents is the primary cause of foaming in sewage treatment plants and hence streams, surface water, pollution. In rural and in some suburban districts the best septic tanks remove from 10 to 20% of these surface active agents and the remainder go to pollute the ground water. It is well known that it takes a long time for ground water to become polluted, but once pollution takes place, it takes considerably more time, approximately three times, to purify it. Many areas throughout the United States are now faced with this problem, and it is expected to get worse with increasing population, the continuing shift to the suburbs, and the increased use of septic tanks.

The mixture of butylated phenols prepared as above yield upon ethoxylation with 6-15 moles of ethylene oxides, a surface active agent which is sufficiently biodegradable to eliminate foaming as may be noted from the following experiments:

*Example VII*

259 grams of the mixture of alkylated phenols of Example I, representing one mole of reactive hydroxyl as determined by the conventional hydroxyl number determination, were ethoxylated in the conventional manner with 396 grams (9 moles) of ethylene oxide to yield 655 grams of a clear liquid with a cloud-point of 4° C. in distilled water, and having an $n_D^{25}$ 1.4820 and a specific gravity of 1.025.

*Example VIII*

Example VII was repeated with the exception that 259 grams of the mixture of alkylated phenols of Example I were replaced by the same amount of the liquid alkylated phenol mixture of Example II.

*Example IX*

Example VII was again repeated with the exception that 259 grams of the mixture of alkylated phenols of Example I were replaced by the same amount of the liquid alkylated phenol mixture of Example III.

The products of Examples VII to IX inclusive and a product obtained by the ethoxylation of 1 mole of tri-tertiary butylphenol with 9 moles of ethylene oxide in the conventional manner to serve as control were subjected to biodegradability measurements. The latter involves an estimated measurement of the oxygen utilized in a Warburg Respirometer by the microorganisms in oxidizing the products (detergents) in accordance with the procedure outlined by Henkelekion and Rand, "Sewage and Industrial Wastes," vol. 27, No. 9, September 1955.

In the tests with the foregoing products, the amount of oxygen absorbed in mg./liter was obtained daily over a period of from 8 to 13 days. The detergents were dissolved in distilled water containing required minerals, nitrogen source and phosphorus source, and were studied at a concentration of active material of 30 mg./l. This concentration was sufficiently high to obtain meaningful data, but not unrealistically high.

The source of the microorganisms was settled sewage from Marlboro, New Jersey. The volume of seed was equal to 10 percent of the volume of sample tested. The initial run used only Marlboro sewage as "seed." The second run used both Marlboro sewage and material obtained by centrifugation of the samples from the first run. Thus, part of the "seed" was partially "adapted" to these substrate. Unfortunately, high $O_2$ utilization was obtained in control flasks which contained the same substrate and seen without the detergent as a result of which negative $O_2$ utilization values were obtained from the flasks containing the detergents. Therefore, a third run was made, using Manville, New Jersey sewage and "adapted seed" from the first run. A fourth run was also made using Manville, New Jersey sewage and "adapted seed" from the third run. This gave the population two chances to adapt itself to these organic substrates. To prevent nitrification from interfering in the last two runs, nitrates were used as a source of nitrogen, replacing the ammonia used during the first two runs.

The results of the above measurements, given as BOD (biological oxygen demand) values in parts per part for 5 days at 20° C. are given in the following table:

| Ethoxylate of: | B.O.D. |
|---|---|
| Tri-tertiary butylphenol | 0.03 |
| Example VII | 0.43 |
| Example VIII | 0.41 |
| Example IX | 0.42 |

Example X

In an endeavor to simulate the complex mixture of alkylated phenols resultant from reacting butene-2 with phenol under the conditions disclosed in Example I, a synthetic admixture consisting of 8 parts of 2,4-di-secondary butylphenol, 4 parts of 2,4,6-tri-secondary butylphenol, 9 parts of 2-octylphenol, 9 parts of 4-octylphenol, 32.5 parts of 2-secondary butyl-4-octylphenol, 32.5 parts of 4-secondary butyl-2-octylphenol, 2.5 parts of 2-dodecylphenol and 2.5 parts of 4-dodecylphenol were ethoxylated as in Example VIII. The resultant ethoxylate had a cloud point of 4.2° C. in distilled water, and had an $n_D{}^{25}$ 1.4217 and a specific gravity of 1.025. The biological oxygen demand for this product was substantially identical with the ethoxylate of Example VII.

The foregoing data clearly shows that the ethoxylates of the liquid alkylated phenols prepared in accordance with the present invention are definitely more biodegradable than the corresponding ethoxylate of tri-tertiary butylphenol.

When the complex liquid alkylated phenol compositions of the present invention are reacted with alkylene oxides such as ethylene oxide, propylene oxide, butylene oxide and mixtures of these oxides, products useful as nonionic surfactants are obtained. Of particular interest are the alkoxylates containing from 1 to 150 moles of ethylene oxide. Those containing from 1 to 10 moles of ethylene oxide are useful as defoamers, emulsifiers and bases for manufacture of anionic surfactants. Those containing from 10 to 20 moles of ethylene oxide are useful for general purposes such as detergents, wetting agents and emulsifiers. Those containing from 20 to 150 moles are useful as latex stabilizers, dispersants and as detergents or emulsifiers for use in strong electrolytes. When these phenol compositions are reacted with from 1 to 150 moles of propylene oxide, the products become more hydrophobic with increasing oxide and are useful as additives for petroleum products, defoamers and the like. Similar products are obtained when butylene oxide is substituted for propylene oxide. The above alkoxylates may in turn be reacted with a dissimilar alkylene oxide. When an ethoxylate is reacted with propylene oxide or butylene oxide, a lower foaming surfactant is obtained. These products are useful in the formulation of detergents for mechanical dishwashing, spray cleaning and other mechanical cleaning processes where foam is objectionable. Mixtures of alkylene oxides such as ethylene oxide and propylene oxide reacted with the phenol compositions yield surfactants useful as emulsifiers, dispersing agents and detergents. Mixtures of ethylene oxide and butylene oxide yield similar products.

We claim:

A biodegradable surface active agent consisting of the condensation product of from 1 to 150 moles of ethylene oxide with 1 mole of a complex liquid mixture obtained by the alkylation of 1 mole by weight of phenol with 2 to 4 moles by weight of butene-2 in the presence of from 0.6 to 1.9 parts by weight of boron trifluoride at a temperature ranging from 50° to 100° C. for period of time ranging from 7 to 24 hours, said complex liquid mixture comprising from about 15 to 55% of a mixture consisting of 2,4-di-secondary butyl phenol, 2,4,6-tri-secondary butyl phenol, 2-octylphenol and 4-octylphenol, 40 to 85% of a mixture consisting of 2-secondary butyl-4-octylphenol and 4-secondary butyl-2-octylphenol, and from about 0.0% to 5% of a mixture consisting of substantially 2-dodecylphenol and 4-dodecylphenol.

References Cited by the Examiner

UNITED STATES PATENTS

| | | | |
|---|---|---|---|
| 2,213,477 | 9/1940 | Steindorff et al. | 260—613 |
| 2,298,660 | 10/1942 | Stevens et al. | 260—624 |
| 2,529,209 | 11/1950 | Ayo et al. | 260—613 |
| 2,555,285 | 5/1951 | Black | 260—613 |
| 2,739,172 | 3/1956 | Peters | 260—624 |
| 3,169,987 | 2/1965 | Block | 260—624 |

LEON ZITVER, *Primary Examiner.*

B. HELFIN, *Assistant Examiner.*